United States Patent
Muto

(10) Patent No.: US 9,762,762 B2
(45) Date of Patent: Sep. 12, 2017

(54) CONTROL DEVICE, IMAGE PROCESSING SYSTEM AND CONTROL METHOD

(71) Applicant: Konica Minolta, Inc., Tokyo (JP)

(72) Inventor: Hikaru Muto, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/108,498

(22) Filed: Dec. 17, 2013

(65) Prior Publication Data

US 2014/0168682 A1   Jun. 19, 2014

(30) Foreign Application Priority Data

Dec. 19, 2012   (JP) ................. 2012-276419

(51) Int. Cl.
*H04N 1/00* (2006.01)

(52) U.S. Cl.
CPC ..... *H04N 1/00493* (2013.01); *H04N 1/00973* (2013.01); *H04N 1/00222* (2013.01); *H04N 1/00482* (2013.01); *H04N 2201/001* (2013.01); *H04N 2201/0074* (2013.01); *H04N 2201/0094* (2013.01)

(58) Field of Classification Search
CPC ................................. H04N 1/00493
See application file for complete search history.

(56) References Cited

U.S. PATENT DOCUMENTS

| | | |
|---|---|---|
| 5,798,738 A | 8/1998 | Yamada |
| 2006/0290680 A1* | 12/2006 | Tanaka et al. ............... 345/173 |
| 2006/0290726 A1 | 12/2006 | Takahashi |
| 2010/0177349 A1* | 7/2010 | Tarumi ......................... 358/1.15 |
| 2010/0231946 A1* | 9/2010 | Shozaki ............ H04N 1/00241 358/1.13 |
| 2012/0019862 A1 | 1/2012 | Hiruma |
| 2012/0069382 A1 | 3/2012 | Osada |

FOREIGN PATENT DOCUMENTS

| | | |
|---|---|---|
| JP | 08-329005 A | 12/1996 |
| JP | 2011-218810 A | 11/2011 |
| JP | 2012-29011 A | 2/2012 |
| JP | 2012-066453 A | 4/2012 |

OTHER PUBLICATIONS

Translation of Japanese patent application JP 2011-218810.*
Japanese Office Action dated Nov. 25, 2014 in corresponding Japanese Patent Application No. 2012-276419, with full English Translation (4 pages).

* cited by examiner

*Primary Examiner* — Mohammad Ghayour
*Assistant Examiner* — Lennin Rodriguezgonzale
(74) *Attorney, Agent, or Firm* — Buchanan Ingersoll & Rooney PC

(57) ABSTRACT

A terminal device as a control device is provided with a CPU including: an obtaining unit for obtaining screen information from an MFP; a first display unit for displaying an operation screen based on the screen information; a first transmission unit for transmitting, to the MFP, position information based on a user's instruction to the operation screen; a determination unit for determining whether a state change influencing communication with MFP occurs or not; a second display unit for displaying an alternative screen generated based on the screen information; a storage unit for storing a parameter based on a user's instruction to the alternative screen; and a second transmission unit for transmitting the stored parameter to the MFP.

34 Claims, 10 Drawing Sheets

CONTROL DEVICE, IMAGE PROCESSING SYSTEM AND CONTROL METHOD

This application is based on Japanese Patent Application No. 2012-276419 filed with the Japan Patent Office on Dec. 19, 2012, the entire content of which is hereby incorporated by reference.

BACKGROUND OF THE INVENTION

Field of the Invention

The present invention relates to a control device, an image processing system and a control method, and particularly to a control device, an image processing system and a control method for remotely controlling an image forming apparatus by using the control device.

Description of the Related Art

There is a method referred to as a so-called remote panel as a method of controlling a device to be controlled using a remote control device. According to this method, the information on an operation screen of the device to be controlled is transmitted to the control device, and information specifying the operation position on the operation screen displayed on the control device based on the transmitted information is transmitted to the device to be controlled. In the device to be controlled, details of an instruction are specified based on the information specifying the operation position and the display screen, to perform a process according to the instruction. Then, when the operation screen shifts as a result of the process, the information on the operation screen is further transmitted to the control device.

An example of the device to be controlled may be an image forming apparatus such as a printer, a copier, a facsimile transceiver, and an MFP (Multi-Functional Peripheral) combining functions thereof.

According to this control method, by repeatedly performing transmission of the information of the operation screen from the device to be controlled to the control device that are positioned remotely from each other, and transmission of the information specifying the operation position from the control device to the device to be controlled, the process in the device to be controlled proceeds. Accordingly, when errors, failures and the like occur in the device to be controlled during the operation and the state of the device is changed, the user operating the device to be controlled using the control device becomes unable to continuously perform the operation. Also, the user operates the device to be controlled using the remotely arranged control device. Accordingly, even when the state of the device to be controlled is changed, the user cannot immediately notice the change and continues the operation, with the result that the operation may be wasted.

In order to address such a problem, for example, Japanese Laid-Open Patent Publication No. 2011-218810 discloses a system by which, when a failure occurs in the device to be controlled to thereby disable communication with the control device, communication with the control device is performed by switching to an alternative device, thereby allowing continuous controlling.

However, the technique disclosed in Japanese Laid-Open Patent Publication No. 2011-218810 poses a problem that it becomes impossible to continuously perform the process using the information saved in the device to be controlled before a state change occurs, the state of this information, and the like.

Furthermore, when a failure occurs in the device to be controlled, an alternative device is used in place of this device. This causes a sudden change in the operation environment from the original device to be controlled, so that user's convenience may be impaired.

Furthermore, when the alternative device is an image forming apparatus located farther than the original device to be controlled or an image forming apparatus that is not usually used, user's convenience may also be impaired.

SUMMARY OF THE INVENTION

The present invention has been made in light of the above-described problems, and an object of the present invention is to provide a control device, an image processing system, and a control method, by which the process can be continuously performed while suppressing user's inconvenience even when a state change occurs in the device to be controlled.

In order to achieve the above-described object, according to an aspect of the present invention, a non-transitory computer-readable storage medium stores a control program for causing a computer mounted in a control device to remotely control an image forming apparatus. The control device and the image forming apparatus are capable of conducting communication with each other. The control program causes the computer to perform: obtaining screen information from the image forming apparatus by giving a request to the image forming apparatus, the screen information being information for displaying an operation screen displayed on the image forming apparatus; causing a display device to display the operation screen based on the screen information; accepting a user's instruction to the operation screen; transmitting information specifying an instructed position on the operation screen based on the user's instruction to the image forming apparatus; determining whether a state change influencing the communication with the image forming apparatus occurs or not due to a process according to the user's instruction; causing the display device to display an alternative screen generated based on the screen information when it is determined that the state change occurs in the image forming apparatus in determining whether a state change occurs or not; storing a parameter based on a user's instruction to the alternative screen in a storage device; determining whether the state change ended or not; and when it is determined that the state change ended in determining whether the state change ended or not, recovering communication with the image forming apparatus, and transmitting the parameter stored in the storage device to the image forming apparatus.

Preferably, when it is determined that the state change occurs in determining whether a state change occurs or not, the control program causes the computer to further perform determining a degree of influence of the state change upon the communication. Displaying an alternative screen includes displaying an alternative screen in accordance with the degree of influence upon the communication.

Preferably, in a first case that a decreased amount of the communication as the degree of influence of the state change upon the communication is less than a prescribed amount, the control program causes the computer to further perform generating, based on screen information less in information amount than the screen information of the operation screen displayed on the image forming apparatus, a screen simpler than the operation screen displayed on the image forming apparatus as the alternative screen. In a second case that the decreased amount of the communication is greater than the prescribed amount, the control program causes the computer to further perform generating, based on screen information of an operation screen that can be shifted from the operation screen displayed on the image forming apparatus in addition to the screen information of the operation screen displayed on the image forming apparatus, a screen as the alternative screen on which display contents on the operation screen displayed on the image forming apparatus and display contents on the operation screen that can be shifted from the operation screen displayed on the image forming apparatus are displayed in one screen.

Preferably, the operation screen includes items to be set and options of parameters that can be set for each of the items. In the second case, generating a screen includes generating the alternative screen by inputting the items and the options of parameters for each of the items that are obtained from the screen information into a page form stored in advance.

Preferably, in the second case, the control program causes the computer to further perform determining a duration during which the changed state continues. Generating a screen includes generating the alternative screen based on the screen information of each of operation screens that have shifted in accordance with the duration.

Preferably, the operation screen displayed on the image forming apparatus and the operation screen that can be shifted from the operation screen displayed on the image forming apparatus present a hierarchical structure. In the second case, generating a screen includes generating the alternative screen based on the screen information reduced in number of items or number of options in accordance with a depth of a hierarchical level from the operation screen displayed on the image forming apparatus.

Preferably, the operation screen includes a plurality of objects each having a display attribute. In the first case, generating a screen includes generating the alternative screen based on the screen information from which the display attribute of the operation screen displayed on the image forming apparatus is reduced.

Preferably, when it is determined that a state change occurs in the image forming apparatus in determining whether a state change occurs or not, generating an alternative screen includes generating the alternative screen based on the screen information obtained from another device stored in advance and different from the image forming apparatus.

Preferably, the control program causes the computer to further perform storing the screen information of the operation screen displayed on the display device in displaying the operation screen. When it is determined that a state change occurs in the image forming apparatus in determining whether a state change occurs or not, generating an alternative screen includes generating the alternative screen based on the screen information stored in storing the screen information.

Preferably, determining whether a state change occurs or not includes analyzing contents of a notification received from the image forming apparatus, to determine whether the state change will occur or not before the state change occurs in the image forming apparatus.

Preferably, determining whether a state change occurs or not includes monitoring traffic of communication with the image forming apparatus, and determining that the state change occurs when the traffic of communication becomes equal to or less than a threshold value.

Preferably, the control program causes the computer to perform, when a user's instruction to the alternative screen is to instruct a process that can be performed by the control device, performing the process according to the user's instruction in place of storing a parameter.

Preferably, determining whether the state change ended or not includes, after it is determined that the state change occurs in the image forming apparatus in determining whether a state change occurs or not, monitoring traffic of communication with the image forming apparatus, and determining that the state change ended when the traffic of communication becomes equal to or greater than a threshold value.

Preferably, the control program causes the computer to further perform determining a duration during which the changed state continues. Determining whether the state change ended or not includes monitoring the traffic of communication with the image forming apparatus at a timing based on the duration.

Preferably, determining whether the state change ended or not includes, after it is determined that the state change occurs in the image forming apparatus in determining whether a state change occurs or not, analyzing contents of a notification received from the image forming apparatus, to determine whether the state change ended or not.

According to another aspect of the present invention, a control device is capable of remotely controlling an image forming apparatus. The control device includes an obtaining unit for obtaining screen information from the image forming apparatus by communication with the image forming apparatus, that is information for displaying an operation screen displayed on the image forming apparatus; a first display unit for causing a display device to display the operation screen based on the screen information; a first transmission unit for transmitting information to the image forming apparatus by communication with the image forming apparatus when accepting a user's instruction to the operation screen, the information specifying an instructed position on the operation screen based on the user's instruction; a determination unit for determining whether a state change influencing the communication with the image forming apparatus occurs or not; a second display unit for causing the display device to display an alternative screen generated based on the screen information when it is determined that the state change occurs in the image forming apparatus; a storage unit for storing a parameter based on a user's instruction to the alternative screen in a storage device; and a second transmission unit for transmitting the parameter stored in the storage device to the image forming apparatus by communication with the image forming apparatus when it is determined that the state change ended.

According to still another aspect of the present invention, an image processing system includes an image forming apparatus; and a control device capable of communicating with the image forming apparatus for remotely controlling the image forming apparatus. The control device includes an obtaining unit for obtaining screen information from the image forming apparatus by communication with the image forming apparatus, that is information for displaying an operation screen displayed on the image forming apparatus; a first display unit for causing a display device to display the operation screen based on the screen information; a first transmission unit for transmitting information to the image forming apparatus by communication with the image forming apparatus when accepting a user's instruction to the operation screen, the information specifying an instructed position on the operation screen based on the user's instruction; a determination unit for determining whether a state change influencing the communication with the image forming apparatus occurs or not; a second display unit for causing the display device to display an alternative screen generated based on the screen information when it is determined that the state change occurs in the image forming apparatus; a storage unit for storing a parameter based on a user's instruction to the alternative screen in a storage device, and a second transmission unit for transmitting the parameter stored in the storage device to the image forming apparatus by communication with the image forming apparatus when it is determined that the state change ended.

According to still another aspect of the present invention, a control method is to remotely control an image forming apparatus by a control device capable of communicating with the image forming apparatus. The control method includes: requesting, by the control device, the image forming apparatus to transmit screen information to the control device that is information for displaying an operation screen displayed on the image forming apparatus; causing, by the control device, a display device to display the operation screen based on the screen information; accepting, by the control device, a user's instruction to the operation screen; transmitting, by the control device, information specifying a position on the operation screen based on the user's instruction to the image forming apparatus; determining, by the control device, whether a state change influencing communication between the image forming apparatus and the control device occurs or not in the image forming apparatus due to a process according to the user's instruction performed by the image forming apparatus; causing, by the control device, the display device to display an alternative screen generated based on the screen information when the control device determines that the state change occurs in determining whether a state change occurs or not; storing, by the control device, a parameter based on a user's instruction to the alternative screen in a storage device; determining, by the control device, whether the state change ended or not in the image forming apparatus; and when the control device determines that the state change ended in determining whether the state change ended or not, recovering communication between the control device and the image forming apparatus, and transmitting the parameter stored in the storage device to the image forming apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
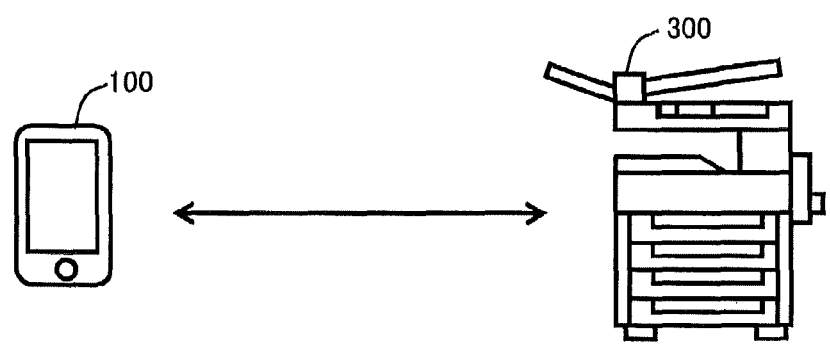
FIG. 1 is a diagram showing a specific example of the configuration of an image processing system according to an embodiment.

The embodiments of the present invention will be hereinafter described with reference to the accompanying drawings. In the following description, the same parts and components are designated by the same reference characters. Names and functions thereof are also the same. Accordingly, detailed description thereof will not be repeated.

<System Configuration>

FIG. 1 is a diagram showing a specific example of the configuration of an image processing system according to the present embodiment.

Referring to FIG. 1, the image processing system according to the present embodiment includes a terminal device 100 as a control device, and an MFP (Multi-Functional Peripheral) 300 as an image forming apparatus to be controlled.

Examples of terminal device 100 may be a mobile phone, a small notebook PC, a digital book, and the like. It is to be noted that terminal device 100 is merely an example of the control device but not limited to a terminal. In addition, terminal device 100 may be a personal computer (PC) and the like.

Terminal device 100 and MFP 300 may be able to communicate with each other via a wired or wireless communication network such as LAN (Local Area Network), or may be able to communicate with each other through direct-wired or wireless communication adopting such a technique as NFC (Near Field Communication) which is the international standards for the near field communication technology.

<Device Configuration>

Figure 2:
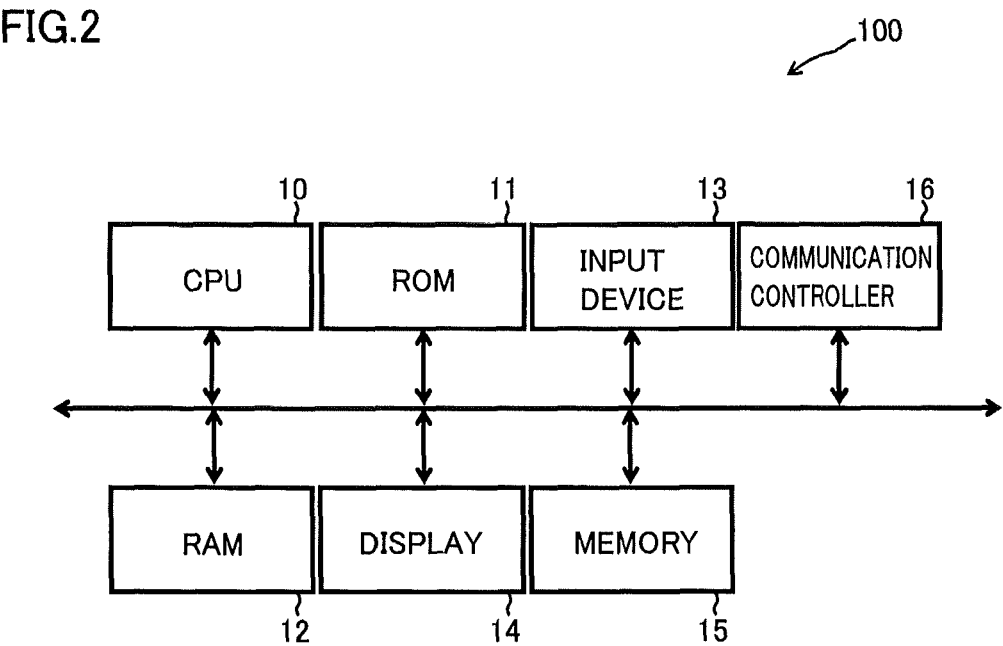
FIG. 2 is a diagram showing a specific example of the hardware configuration of a terminal device included in the image processing system.

FIG. 2 is a diagram showing a specific example of the hardware configuration of terminal device 100.

Referring to FIG. 2, terminal device 100 includes a CPU (Central Processing Unit) 10 that is an operation device for overall control, a ROM (Read Only Memory) 11 for storing a program or the like executed by CPU 10, a RAM (Random Access Memory) 12 for functioning as a work area during execution of a program in CPU 10, an input device 13 such as a switch for accepting an operation input to terminal device 100, a display 14, a memory 15 for storing a file or the like, and a communication controller 16 for controlling communication with MFP 300.

Figure 3:
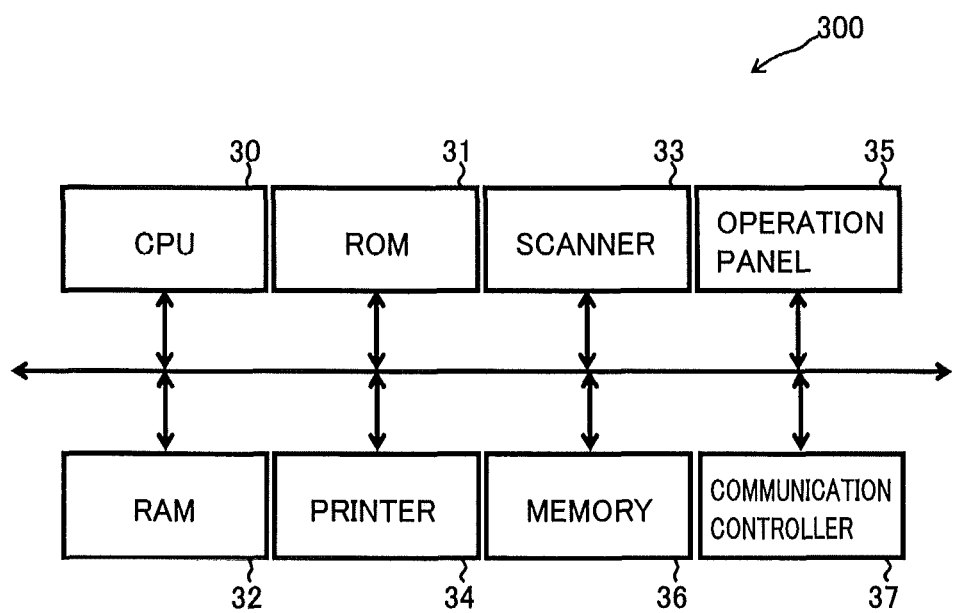
FIG. 3 is a diagram showing a specific example of the hardware configuration of an MFP (Multi-Functional Peripheral) included in the image processing system.

FIG. 3 is a diagram showing a specific example of a hardware configuration of MFP 300.

Referring to FIG. 3, MFP 300 includes a CPU 30 which is an operation device for overall control, a ROM 31 for storing a program or the like executed by CPU 30, a RAM 32 for functioning as a work area during execution of a program in CPU 30, a scanner 33 for obtaining image data by optically scanning a document placed on a not-shown platen, a printer 34 for fixing image data onto printing paper, an operation panel 35 including a touch panel for displaying information or accepting an operation input to MFP 300, a memory 36 for storing image data or the like, and a communication controller 37 for controlling communication with terminal device 100.

Operation panel 35 includes a touch panel and a group of operation keys which are not shown. The touch panel is constructed such that a display device such as a liquid crystal display and a position indicator such as an optical touch panel or a capacitive touch panel are layered. Operation panel 35 displays an operation screen, and specifies a position indicated on the operation screen. CPU 30 causes the touch panel to display an operation screen based on data for displaying a screen which is stored in advance.

The screen information that is information for displaying an operation screen is stored in advance in a prescribed area of memory 15. CPU 30 reads screen information required in accordance with the process from memory 15, and causes operation panel 35 to display an operation screen based on the screen information.

<Operation Outline>

Figure 4:
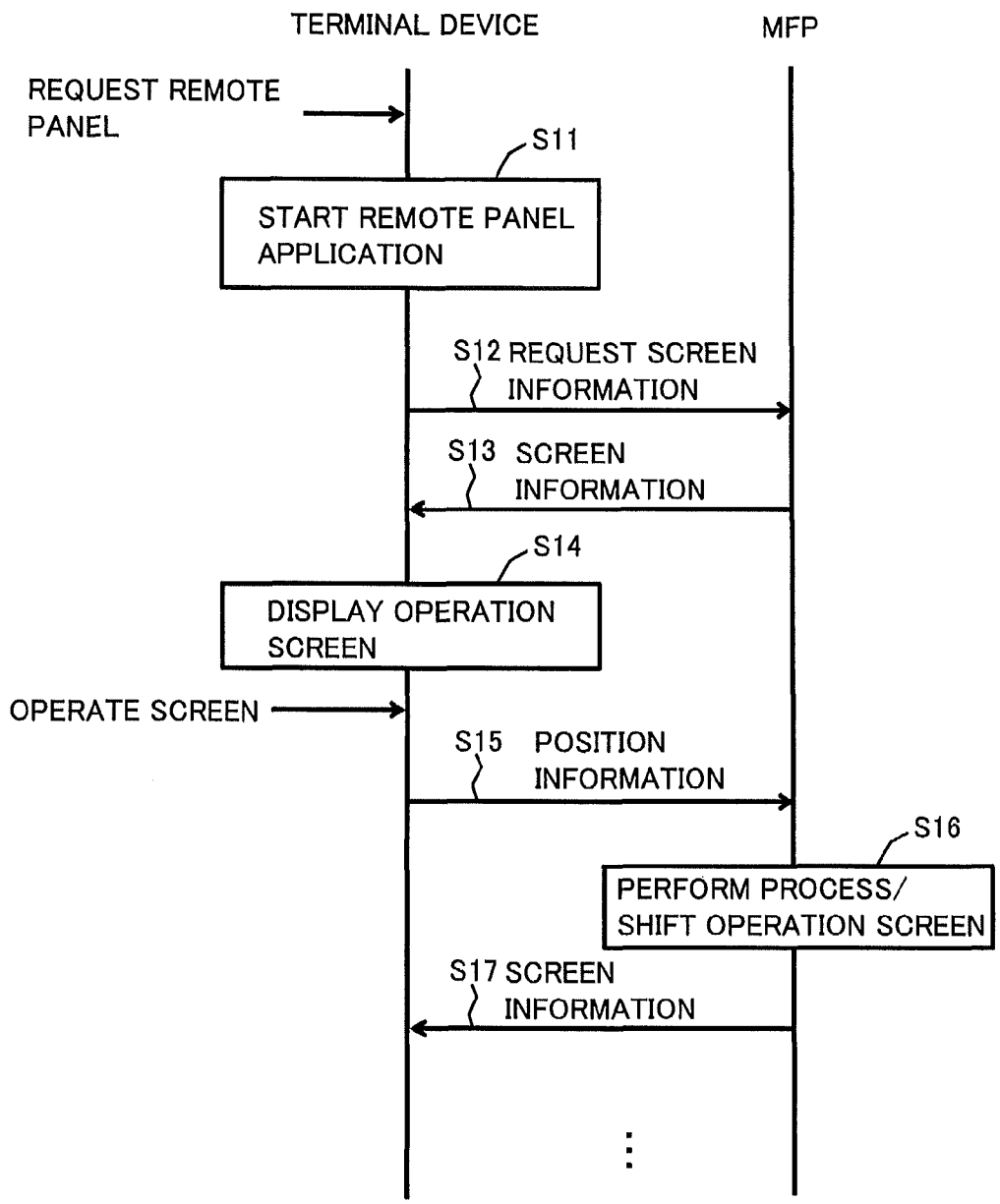
FIGS. 4 and 5 each are a diagram showing the outline of the operation in the image processing system.
Figure 5:
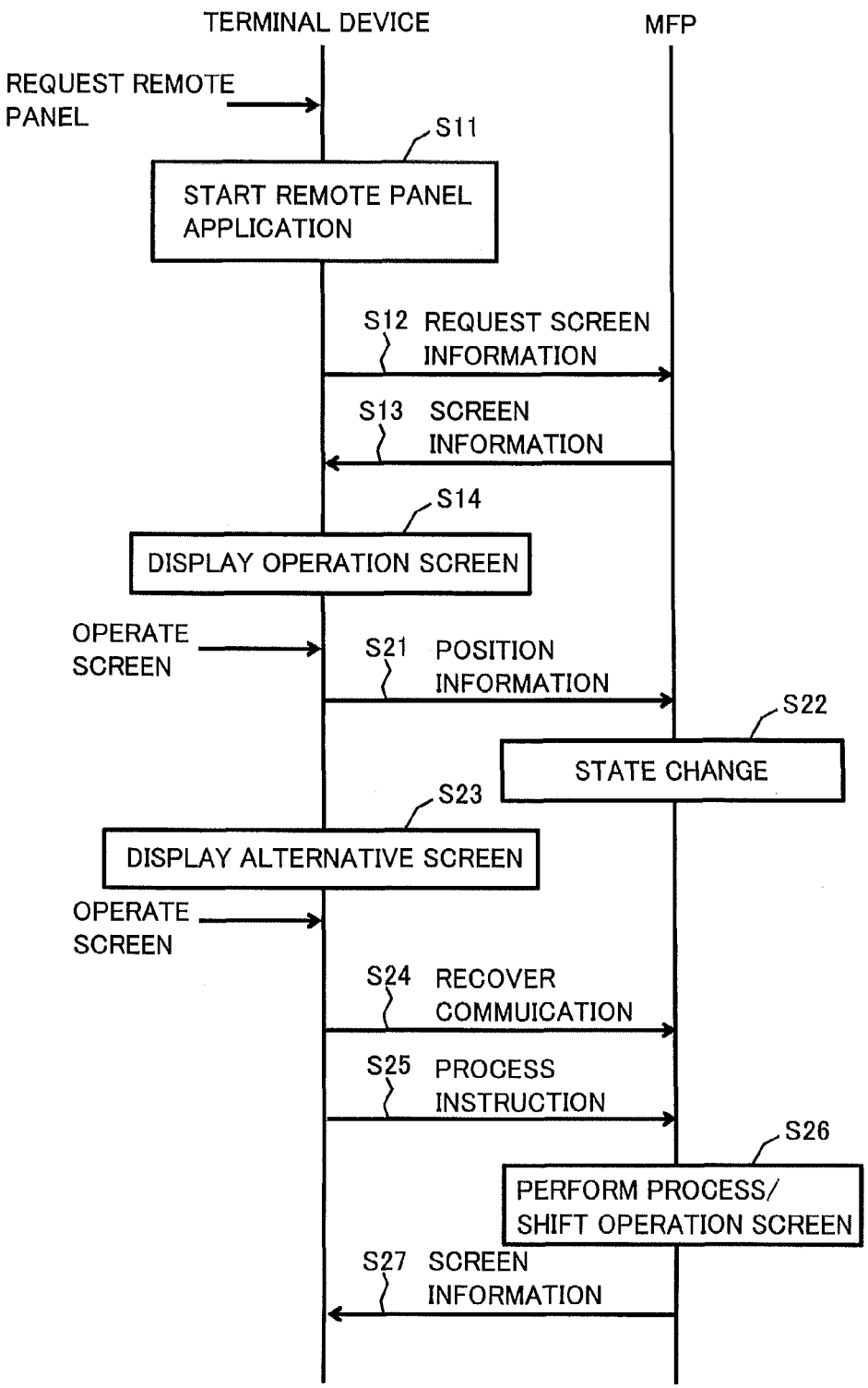

FIGS. 4 and 5 each are a diagram showing the outline of the operation in the image processing system according to the present embodiment. This operation, which is referred to as a so-called remote panel, is performed at the time when MFP 300 is remotely operated by terminal device 100. FIG. 4 shows the flow of the operation in the normal remote panel while FIG. 5 is a diagram showing the flow of the operation at the time when a state change occurs in MFP 300.

Specifically, referring to FIG. 4, when accepting an instruction to start a user remote panel, terminal device 100 starts the application (program) for executing a remote panel operation (step S11). Terminal device 100 requests screen information from MFP 300 as the program is executed (step S12).

When MFP 300 accepts the request for the screen information from terminal device 100, it transmits the screen information, which is information for displaying the operation screen currently displayed on operation panel 35, to terminal device 100 (step S13).

When terminal device 100 receives the screen information from MFP 300, it causes display 14 to display an operation screen based on the screen information (step S14), and stands by for a user's instruction based on the screen. When terminal device 100 accepts the user's instruction based on the displayed operation screen, it transmits the position information, which is information showing the position on the operation screen instructed by the user, to MFP 300 (step S15).

MFP 300 that received the above-mentioned position information specifies the contents of the user's instruction from the displayed operation screen and the position information, performs the process according to the instruction, and causes the operation screen to shift in accordance with the process (step S16). Then, MFP 300 transmits the screen information of the shifted operation screen to terminal device 100 (step S17).

Instructions about the process given to MFP 300 include an instruction about various settings required for an operation and an instruction to start this operation in the settings. The entire operation screen of MFP 300 for making settings in the former case includes items to be set and options of parameters that can be set for each item. The entire operation screen includes a plurality of operation screens hierarchically configured and each displayed on operation panel 35 of MFP 300 at one time. The options of items to be set are arranged on the operation screen on a higher hierarchical level. The options of parameters for each item to be set are arranged on the operation screen on a lower hierarchical level. When an item to be set is selected on the operation screen on the higher hierarchical level, MFP 300 performs the process for switching the operation screen to an operation screen on which the options of parameters of the item are presented, to thereby shift the operation screen. In other words, MFP 300 causes the screen to shift from the operation screen on the higher hierarchical level to the operation screen on the lower hierarchical level according to the user's instruction. Then, it accepts a selection of parameters about the selected item on the operation screen on the lower hierarchical level.

The above-described steps S15 to S17 are subsequently repeated. Consequently, the operation screens of MFP 300 are sequentially displayed on display 14 of terminal device 100, and the process in MFP 300 is to be performed based on the user's instruction to the operation screen of terminal device 100.

When terminal device 100 accepts the user's instruction based on the operation screen displayed on display 14 in step S14, it analyzes the screen information, thereby determining whether a state change occurs or not in MFP 300 when the process according to the user's instruction is performed.

The term "state change" used herein means a change in the state of MFP 300 that influences communication with terminal device 100 for the remote panel operation. As examples of influences upon the communication, communication with terminal device 100 is disabled, and communications traffic is significantly decreased as compared with the communications traffic during the normal remote panel operation. Accordingly, the term "state change" used herein means a state change by which communication with terminal device 100 for the remote panel operation is disabled, and a state change by which the communications traffic is significantly decreased as compared with the communications traffic during the normal remote panel operation.

For example, when MFP 300 switches the application to be performed according to the user's instruction, it also switches the setting of the main unit so as to be the setting required for this application. For example, when selecting an application to be operated in cooperation with an external device, MFP 300 switches the setting of the main unit so as to achieve a security level in accordance with the operation of this application in conjunction with this selection. Communication with terminal device 100 is interrupted during the operation of switching the setting of the main unit. There may be a case where restart is subsequently further required. Alternatively, depending on the switching operation, there may also be a case where communication with terminal device 100 is enabled though the communications traffic during the operation is decreased.

Alternatively, MFP 300 may need to be restarted at the timing in accordance with the user's instruction such as addition or deletion of an application, for example. Also in such a case, communication with terminal device 100 is interrupted.

Terminal device 100 can specify the process according to the user's instruction by the above-described analysis. Terminal device 100 stores the details of a required operation (a switching operation, restart and the like) for each combination of applications to be switched, specifically, stores the details of a process, for example, as to what switching operation is required in advance for each process in MFP 300, as to whether restart is required or not, and the like. By referring to the stored process details, terminal device 100 can specify whether the above-described switching operation is required or not and whether restart is required or not, depending on the process according to the user's instruction. Based on this, terminal device 100 can determine whether a state change occurs or not in MFP 300.

It is to be noted that the determination by terminal device 100 is not limited to the above-described method. As another method, for example, MFP 300 may notify terminal device 100 of the details of the process based on the user's instruction, and terminal device 100 may analyze the notification, thereby determining whether a state change occurs or not due to the process. Alternatively, MFP 300 may determine in advance whether a state change occurs or not due to the process, and notify terminal device 100 of the determination result so as to allow terminal device 100 to detect the state change.

Referring to FIG. 5, terminal device 100 transmits, to MFP 300, the position information based on the user's instruction given to the displayed operation screen (step S21). Also, when performing the process according to the user's instruction, terminal device 100 determines whether a state change occurs or not in MFP 300 by conducting an analysis of the screen information and the like. Then, when determining that a state change occurs in MFP 300 by conducting an analysis of the screen information and the like, terminal device 100 causes display 14 to display a screen that is different from the operation screen displayed in step S14 and generated based on the screen information from MFP 300 (step S23). MFP 300 performs a process that is based on the position information in step S21 and accompanied by a state change as described above (step S22).

The alternative screen used herein is a simple screen whose information amount is equal to or less than that of the operation screen displayed on operation panel 35 of MFP 300. Specifically, the alternative screen is an operation screen in which the traffic of communication with MFP 300 for displaying an entire operation screen on display 14 of terminal device 100 is equal to or less than the traffic of communication during the normal remote panel operation.

An example of the first alternative screen may be an alternative screen in which an operation screen is entirely configured as a simple screen. On this screen, the contents of the operation screens up to a prescribed lower hierarchical level are arranged. Thereby, the contents on the operation screens up to the prescribed lower hierarchical level can be confirmed on this screen without having to shifting this screen. This alternative screen is also referred to as an "entire simple screen". Terminal device 100 stores a page form for the first alternative screen in advance. Then, terminal device 100 can generate an entire simple screen by inputting, into this page form, the screen contents up to a prescribed lower hierarchical level obtained by analyzing the screen information from MFP 300 (for example, script analysis).

An example of the second alternative screen may be an alternative screen in which a prescribed portion of a plurality of operation screens forming an entire operation screen is configured as a simple screen. On this screen, a prescribed display attribute is deleted from among the display-related attributes of objects such as a selection button and an image arranged on each operation screen. This alternative screen is also referred to as a "partial simple screen".

Figure 6:
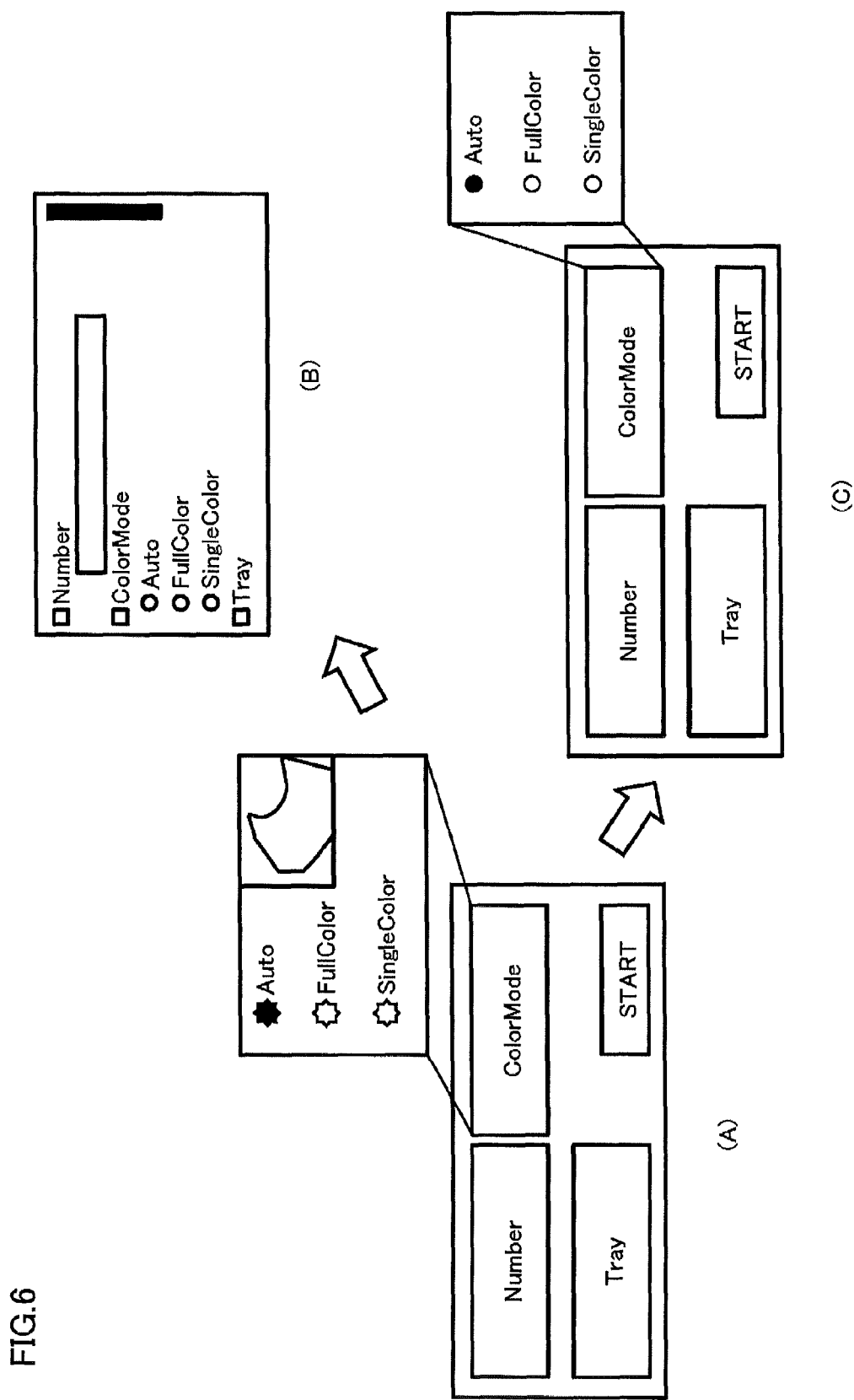
FIG. 6 is a diagram showing the relation between a normal operation screen and each of an entire simple screen and a partial simple screen.

FIG. 6 is a diagram showing the relation between a normal operation screen and each of an entire simple screen and a partial simple screen, including a normal operation screen as (A), an entire simple screen as (B) and a partial simple screen as (C).

Referring to (A) in FIG. 6, on the normal operation screen, "Color", "Color Mode" and "Tray" are arranged on the operation screen on the higher hierarchical level by way of example as options of items to be set. On the operation screen on the hierarchical level lower than the level of this screen, "Auto", "Full Color" and "Single Color" are arranged as options of parameters that can be set in the "Color Mode" as one item in this screen. An operation screen on the lower hierarchical level is prepared also for each of other items such as "Color" and "Tray" in this screen. On each of these operation screens on the lower hierarchical levels, options of parameters that can be set for each item are arranged.

Referring to (B) in FIG. 6, items arranged on the operation screen on the higher hierarchical level in (A) and options of parameters of each item arranged on the operation screen on the lower hierarchical level are arranged on the entire simple screen.

When "Color Mode" is selected on the screen (A) in FIG. 6 and "Single Color" is selected on the operation screen on the lower hierarchical level, it becomes possible to select a specific color on the operation screen on a further lower hierarchical level. In this case, color options may further be arranged on the level below "Single Color" on the entire simple screen. By analyzing the operation screens up to the lower hierarchical level prescribed in advance, terminal device 100 can generate an entire simple screen on which the contents up to the designated hierarchical level are arranged.

By way of example, terminal device 100 may analyze the operation screens up to the lowest hierarchical level, and cause the contents up to the lowest hierarchical level to be arranged on the entire simple screen. Alternatively, terminal device 100 may analyze the operation screens up to the prescribed hierarchical level (for example, up to the highest hierarchical level, the second highest hierarchical level, and the like), and cause the contents up to the prescribed hierarchical level to be arranged on the entire simple screen.

Alternatively, when terminal device 100 determines that a state change occurs, it may further estimate the duration, analyze the operation screens up to the hierarchical level in accordance with the duration, and cause the contents up to the hierarchical level in accordance with the duration to be arranged on the entire simple screen. For example, the longer the duration is, the deeper the hierarchical level may be, to which level the contents of the operation screens are arranged on the entire simple screen. Accordingly, even if the duration for which communication with MFP 300 is disabled becomes longer, the user's operation during this duration can still be accepted. On the other hand, when the duration is relatively short, the contents of the operation screens up to a relatively shallow hierarchical level may be arranged on the entire simple screen. Consequently, it becomes possible to display a required operation screen while making the operation screen easily visible and facilitating the analyzing process.

Alternatively, terminal device 100 may reduce the number of items and the number of options in accordance with the depth of the hierarchical level, and generate an entire simple screen. For example, as the hierarchical level of the operation screen is deeper (the level is lower), terminal device 100 may reduce the number of items and the number of options arranged on this operation screen, so that the reduced number of items and options may be arranged on the entire simple screen. Consequently, by reducing the items and options that the user is less likely to choose to perform, it becomes possible to display a required operation screen while making the operation screen easily visible and facilitating the generation process.

Referring to (C) in FIG. 6, on the partial simple screen, a prescribed display attribute leading to communication load such as a complicated graphic symbol (a star shape as an option) and an image are deleted from the operation screen (A).

By way of example, terminal device 100 stores a display attribute leading to communication load in advance. When terminal device 100 analyzes the screen information and determines that the screen information has the stored display attribute, it deletes this display attribute from the screen information and displays a screen based on this resultant screen information.

Alternatively, terminal device 100 may store, in advance, the priority order by which display attributes are deleted in descending order of load to communication. Then, when the load to communication obtained by analyzing the screen information is equal to or greater than a prescribed threshold value, terminal device 100 may delete the display attributes in descending order of priority until the load becomes equal to or less than the threshold value mentioned above.

When terminal device 100 determines that a state change occurs in MFP 300, it further determines the degree of influence of the state change upon communication between MFP 300 and terminal device 100. The degree of influence is determined by the decreased amount of the communications traffic during the above-mentioned communication from the communications traffic during the normal remote panel operation. In other words, terminal device 100 stores, in advance, a threshold value of the decreased amount to the degree at which communication between MFP 300 and terminal device 100 is disabled, and compares the decreased amount during the communication mentioned above with the threshold value. When this decreased amount is equal to or greater than the threshold value, terminal device 100 determines that communication between MFP 300 and terminal device 100 is disabled. When the decreased amount is less than the threshold value and is equal to or greater than a prescribed amount, the terminal device determines that communication between MFP 300 and terminal device 100 is enabled but the communications traffic is decreased more than that during the normal remote panel operation. The former state (the state where communication is disabled) will be also referred to as the first state while the latter state (the state where communications traffic is decreased) will be also referred to as the second state.

When terminal device 100 determines that the communication state is in the first state, terminal device 100 generates an entire simple screen as a simple screen based on the screen information. In other words, when terminal device 100 determines that the communication state is in the first state, it analyzes the screen information from MFP 300 (for example, script analysis), thereby obtaining screen contents up to a prescribed lower hierarchical level. Then, terminal device 100 generates an entire simple screen by arranging the items to be set and the options of parameters that can be set for each item as obtained screen contents on the page form stored in advance.

As described above, the contents up to the prescribed lower hierarchical level are arranged in one operation screen on the entire simple screen, which eliminates the need of communication for screen shift to the operation screen on this lower hierarchical level. In other words, even when the state of MFP 300 is brought into the first state where communication is disabled, terminal device 100 can cause display 14 to display the operation screen during a time period for which communication is disabled so as to include the contents of the operation screens up to the above-mentioned lower hierarchical level without having to request new screen information from MFP 300. Thus, terminal device 100 can accept the user's instruction. Accordingly, even when a state change occurs in MFP 300 and communication with terminal device 100 becomes disabled, the user of terminal device 100 can continue the intended operation without being aware of it.

When terminal device 100 determines that communication state is in the second state, it generates a partial simple screen as a simple screen based on the screen information. In other words, when terminal device 100 determines that the communication state is in the second state, it analyzes the screen information from MFP 300 (for example, script analysis) to obtain from MFP 300 the screen information from which the display attribute leading to communication load is deleted, and then displays a partial simple screen based on the screen information. Then, when terminal device 100 accepts a user's instruction to the partial simple screen, it transmits the user's instruction to MFP 300, and also for the operation screen as a shift destination, similarly obtains the screen information from which the display attribute leading to communication load is deleted.

As described above, on the partial simple screen, the communications traffic required for shifting an operation screen can be less than the communications traffic during the normal remote panel operation. In other words, even if the state of MFP 300 is brought into the second state where communications traffic is decreased, terminal device 100 can continue the remote panel operation. Thereby, even when a state change occurs in MFP 300 to cause a decrease in the traffic of communication with terminal device 100, the user of terminal device 100 can continue the intended operation without being aware of this decrease.

In the above-described example, terminal device 100 determines based on the user's instruction to the operation screen displayed on its display 14 whether a state change will occur or not in MFP 300 before a state change actually occurs in MFP 300. In this case, at the time when terminal device 100 determines that a state change will occur in MFP 300, it can request screen information from MFP 300 and generate an alternative screen.

On the other hand, this determination may be made by terminal device 100 in response to a notification from MFP 300 as described above. In this case, there may be cases where terminal device 100 determines whether a state change will occur or not before the state change actually occurs; and where terminal device 100 determines whether a state change occurred or not after the state change occurs. In the latter case, terminal device 100 can use the screen information obtained from MFP 300 immediately before that, to generate an alternative screen. As another example, when terminal device 100 stores the operation history in the remote panel operation of MFP 300 performed by the user of terminal device 100 (the displayed operation screen, the instructed position on the operation screen, and the like), terminal device 100 can also generate an alternative screen using memory of the displayed operation screen included in the operation history. Alternatively, when terminal device 100 stores external devices such as an MFP of the same type as MFP 300 and a server in advance, it can also generate an alternative screen from the screen information obtained by requesting screen information from these external devices. In addition, when screen information can be obtained from such external devices, terminal device 100 may display an operation screen itself based on the screen information obtained from these external devices without generating an alternative screen.

Terminal device 100 stores a parameter based on the user's instruction to the alternative screen in a prescribed area of memory 15 while the state change continuously occurs in MFP 300. Alternatively, when this instruction is to instruct such a process as transmission of a designated file to an external storage device, which can be performed without cooperation with MFP 300, terminal device 100 may perform the instructed process.

When terminal device 100 determines that the state change ended in MFP 300, it performs a process for recovering communication with MFP 300 to recover the communication (step S24). After that, terminal device 100 transmits the above-described parameter as a process instruction to MFP 300 (step S25).

As an example of a method of determining by terminal device 100 whether the state change ended or not in MFP 300, there may be a method by which terminal device 100 receives a notification from MFP 300 that the communication state is recovered, and analyzes the notification, thereby determining whether the state change ended or not. There may be another method by which, after determining that a state change occurs in MFP 300, terminal device 100 inquires MFP 300 about the state at a prescribed timing, and determines that the communication state is recovered when it receives a response from MFP 300, but determines that the state change continues when it does not receive a response for a certain period of time. The above-mentioned inquiry may be made continuously at prescribed time intervals after it is determined that a state change will occur in MFP 300. Alternatively, when terminal device 100 determines whether a state change occurs or not in MFP 300 as described above, terminal device 100 may also determine the duration based on the details of the process, thereby predicting the timing at which the state is recovered, and making the above-mentioned inquiry before or after the timing.

When MFP 300 receives the instruction transmitted in step S25, it performs the process according to the instruction and causes the operation screen to shift (step S26). Then, MFP 300 transmits the screen information of the shifted operation screen to terminal device 100 (step S27). The normal remote panel operation shown in FIG. 4 is subsequently performed.

<Functional Configuration>

Figure 7:
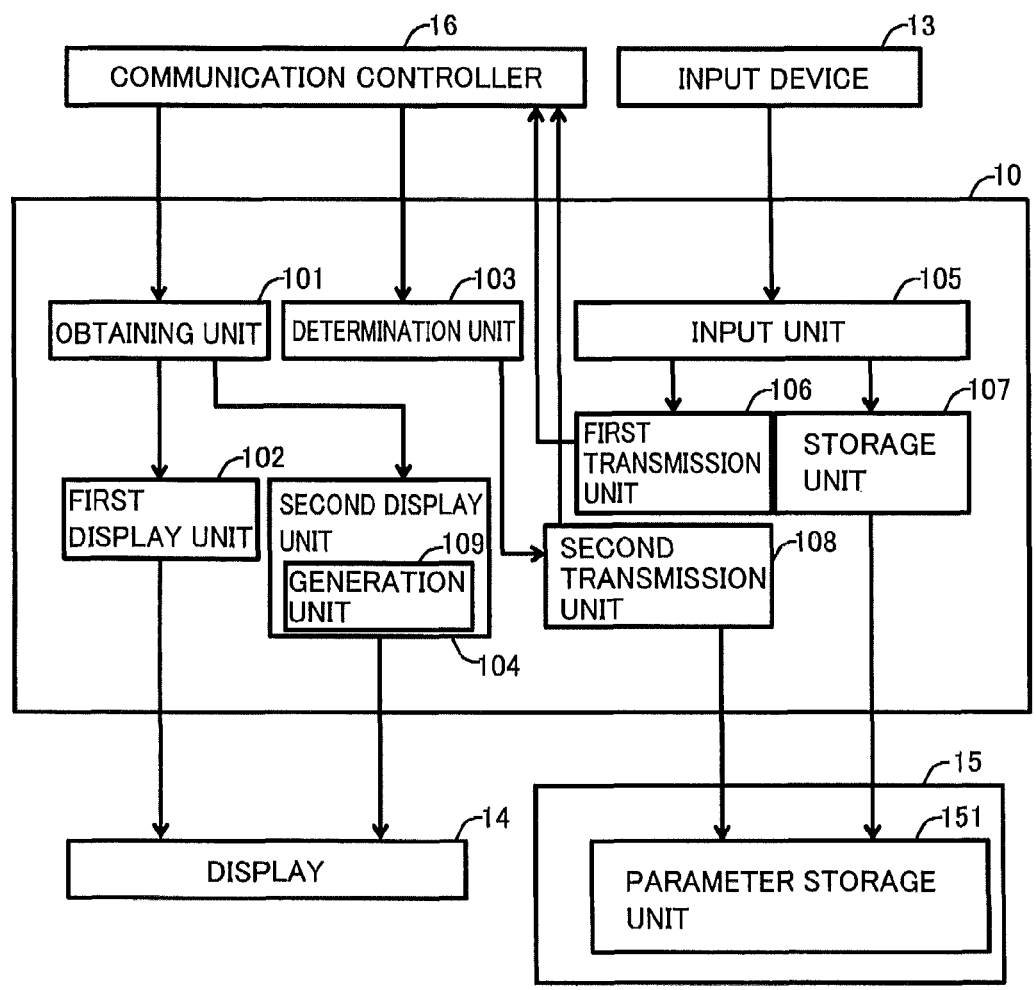
FIG. 7 is a block diagram showing a specific example of the functional configuration of the terminal device.

FIG. 7 is a block diagram showing a specific example of the functional configuration of terminal device 100 for performing the above-described operation. Each function shown in FIG. 7 is implemented mainly by CPU 10 of terminal device 100 reading the program stored in a ROM 11 onto a RAM 12 and executing the program, but may be implemented by the hardware configuration that is at least partially shown in FIG. 2.

Referring to FIG. 7, memory 15 includes a parameter storage unit 151 serving as a storage area for storing a parameter based on the user's instruction to an alternative screen.

Further referring to FIG. 7, CPU 10 includes an obtaining unit 101 for obtaining screen information from MFP 300 through communication controller 16; a first display unit 102 for performing a process to cause display 14 to display the operation screen based on the screen information; a determination unit 103 for determining whether a state change influencing the communication with terminal device 100 occurs or not in MFP 300; a second display unit 104 for performing a process to cause display 14 to display an alternative screen generated based on the screen information when it is determined that the state change occurs in MFP 300; an input unit 105 for accepting an input of the user's instruction in input device 13 for display on display 14; a first transmission unit 106 for transmitting, to MFP 300 through communication controller 16, the information specifying the position on the operation screen instructed by the user; a storage unit 107 for storing a parameter based on the user's instruction to the alternative screen in parameter storage unit 151; and a second transmission unit 108 for reading the parameter stored in parameter storage unit 151 and transmitting the parameter to MFP 300 through communication controller 16 when it is determined that the above-mentioned state change ended in MFP 300.

Second display unit 104 includes a generation unit 109 for generating an alternative screen based on the screen information obtained in obtaining unit 101.

When determination unit 103 determines that the state change occurs in MFP 300, it further determines the degree of influence of the state change upon the communication between terminal device 100 and MFP 300. As an example of the degree of influence upon communication, determination unit 103 determines whether the state of MFP 300 is in the first state where communication with terminal device 100 is disabled, or in the second state where the traffic of communication with terminal device 100 is decreased by a prescribed amount or more from the traffic of communication during the normal remote panel operation.

Generation unit 109 generates an alternative screen of the type in accordance with the determination result by determination unit 103 about the degree of influence upon the communication. In other words, generation unit 109 generates an entire simple screen as described above when determination unit 103 determines that the changed state in MFP 300 is in the first state, and generation unit 109 generates a partial simple screen as described above when determination unit 103 determines that the changed state in MFP 300 is in the second state.

Generation unit 109 stores a page form in advance by way of example. When generating an entire simple screen, generation unit 109 inputs the information obtained by analyzing the screen information (items, options of parameters and the like) into the page form. Generation unit 109 also stores the priority order of the display properties to be deleted by way of example. In order to generate a partial simple screen, when the communications traffic required for transferring the screen information of the target operation screen is equal to or greater than a threshold value, generation unit 109 obtains, from MFP 300, the screen information from which the display properties are deleted sequentially in the above-mentioned priority order until communications traffic becomes equal to or less than the threshold value. Then, generation unit 109 generates a partial simple screen based on this screen information.

When determination unit 103 determines that the state change mentioned above occurs in MFP 300, it further predicts the duration of the state change, that is, the timing at which the above-mentioned state change ends. Generation unit 109 may generate an alternative screen in accordance with the prediction made by determination unit 103 about the duration of the state change.

After determining that the state change occurs in MFP 300, determination unit 103 determines whether the state change ended or not. This determination may be continuously made by determination unit 103 at prescribed time intervals after the state change occurs, or may be made around at the predicted timing in the case that determination unit 103 predicts the timing at which the state change ends.

In addition to the screen information obtained in obtaining unit 101, generation unit 109 may generate an alternative screen based on the history of the operation on the remote panel of MFP 300 performed by the user of terminal device 100, which is stored in a prescribed area of memory 15. Alternatively, generation unit 109 may generate an alternative screen based on the screen information stored in advance, which is obtained from an external device stored in advance such as an MFP of the same type as MFP 300 and a server.

<Operation Flow>

Figure 8:
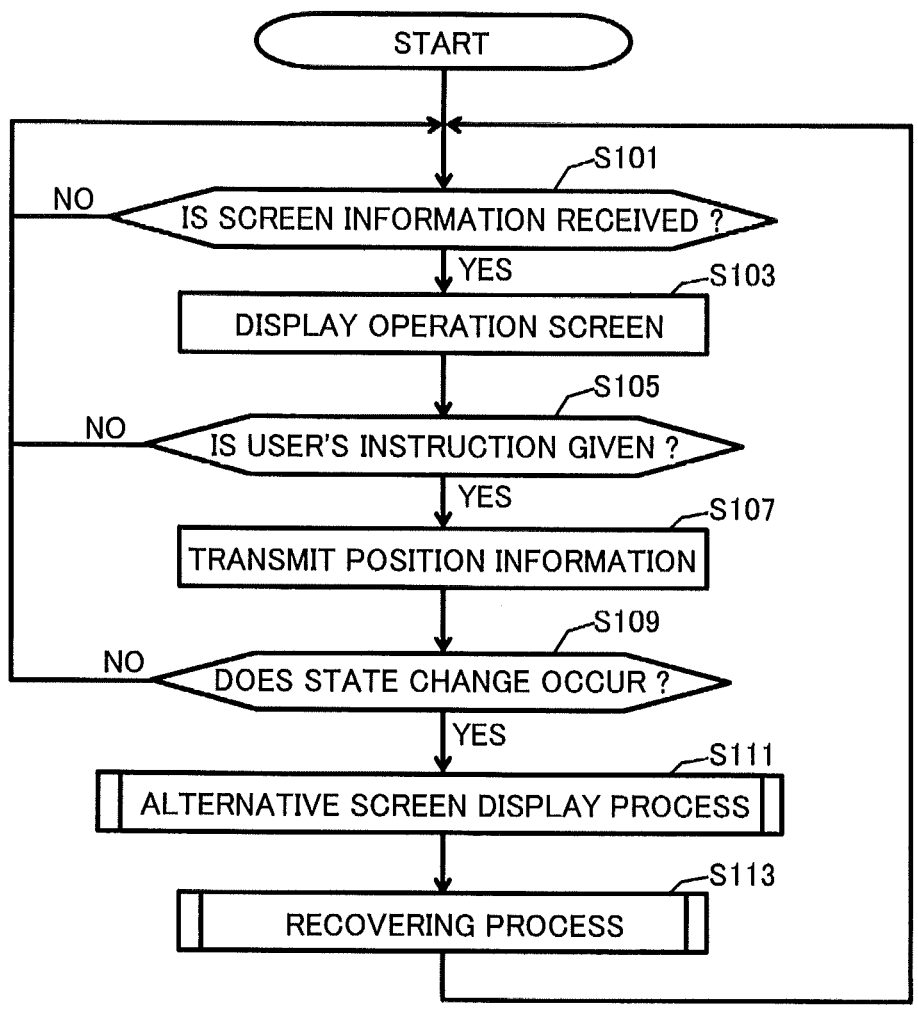
FIG. 8 is a flowchart illustrating an example of the flow of an operation in the terminal device.

FIG. 8 is a flowchart illustrating an example of the flow of an operation in terminal device 100. The operation shown in the flow chart in FIG. 8 is implemented by CPU 10 of terminal device 100 reading the program stored in ROM 11 onto a RAM 12 and executing the program, and causing each function shown in FIG. 7 to be performed. The operation shown in FIG. 8 is performed when terminal device 100 is performing the normal remote panel operation.

In other words, referring to FIG. 8, when CPU 10 receives screen information from MFP 300 (YES in step S101), it causes display 14 to display an operation screen based on the screen information (step S103).

When CPU 10 accepts the user's instruction to the operation screen displayed in step S103 (YES in step S105), it transmits the position information showing the instructed position on the operation screen to MFP 300 (step S107).

Furthermore, CPU 10 analyzes the user's instruction in step S105, thereby determining whether a state change occurs or not, which influences the communication with terminal device 100 by MFP 300 performing the process according to the user's instruction. Consequently, when CPU 10 determines that such a state change occurs (YES in step S109), it performs an alternative screen display process for displaying an alternative screen (step S111). Then, CPU 10 performs a recovering process for recovering the communication with MFP 300 to a communicating state during the normal remote panel operation (step S113). Then, when CPU 10 recovers the communication with MFP 300, it returns the operation to step S101, and repeats the process as described above.

Figure 9:
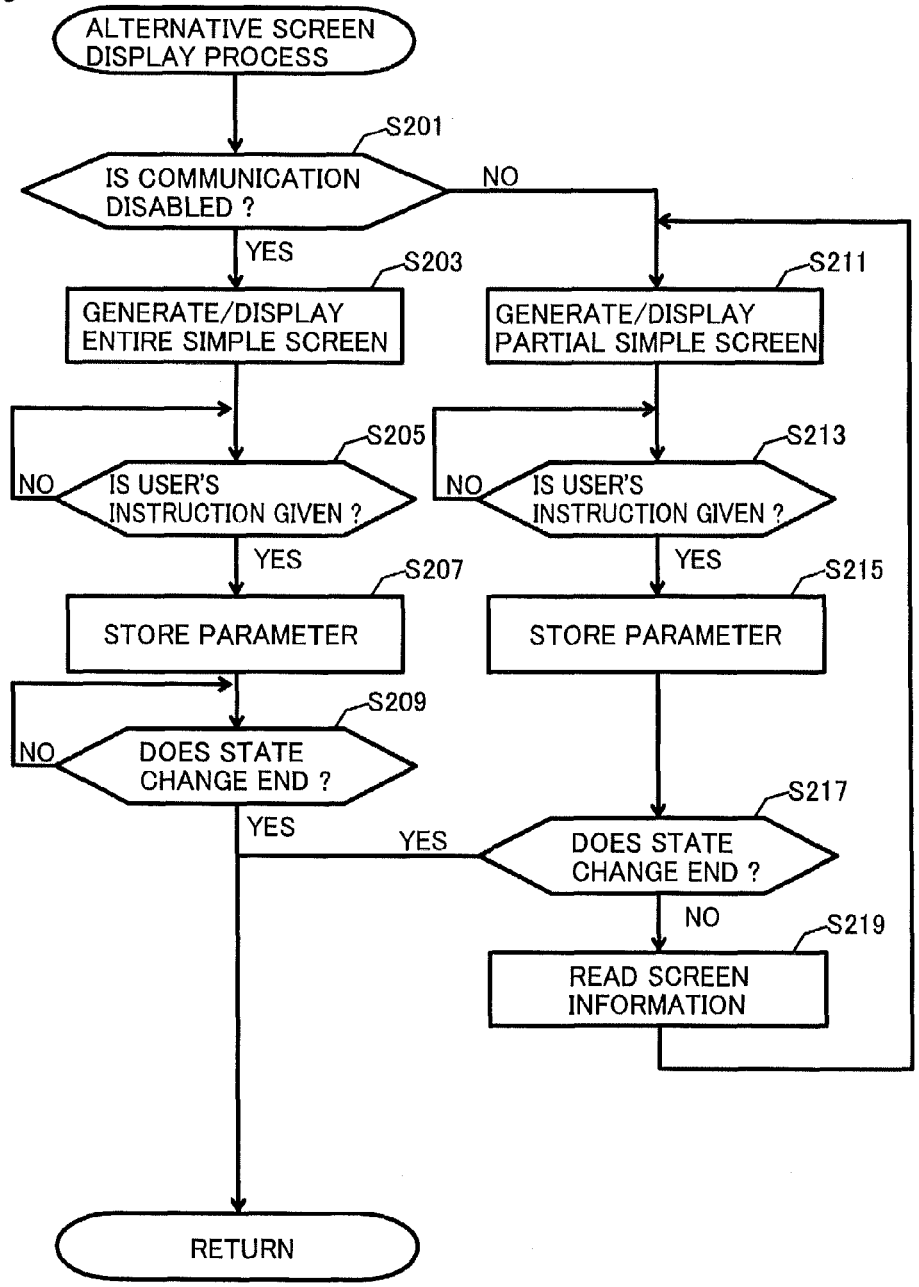
FIG. 9 is a diagram showing a specific example of an alternative screen display process in step S111 in FIG. 8.

FIG. 9 is a diagram showing a specific example of the alternative screen display process in step S111. Referring to FIG. 9, when CPU 10 determines that the above-mentioned state change occurs in MFP 300, it further determines the degree of influence upon communication so as to determine whether or not this state change disables communication with terminal device 100, and whether or not this state change causes a decrease in the communications traffic by a prescribed amount or more from the communications traffic during the normal remote panel operation.

Consequently, when CPU 10 determines that the state change disabling communication occurs (YES in step S201), it generates an entire simple screen as an alternative screen that is simpler than the operation screen displayed on MFP 300, and causes display 14 to display the generated entire simple screen (step S203).

When CPU 10 accepts the user's instruction to the entire simple screen that is an alternative screen displayed in step S203 (YES in step S205), it stores a parameter based on the user's instruction (step S207).

CPU 10 determines whether the above-mentioned state change ended or not in MFP 300. This is implemented by way of example as follow: specifically, when terminal device 100 inquires MFP 300 about the state and receives a response from MFP 300, CPU 10 determines that the state is recovered.

When it is determined that the state change ended (YES in step S209), CPU 10 ends the alternative screen display process, and returns the process to the operation in FIG. 8.

On the other hand, when it is determined that a state change occurs by which the communications traffic is decreased by a prescribed amount or more from the communications traffic during the normal remote panel operation (NO in step S201), CPU 10 obtains, from MFP 300, the screen information whose information amount is less than the information amount of the screen information of the operation screen displayed on MFP 300. Then, CPU 10 generates a partial simple screen as an alternative screen that is simpler than the operation screen displayed on MFP 300 based on the screen information, and causes display 14 to display the generated partial simple screen (step S215).

When CPU 10 accepts a user's instruction to the entire simple screen as an alternative screen displayed in step S211 (YES in step S213), it stores a parameter based on the user's instruction (step S215).

As a result of determining whether the state change ended or not in MFP 300, when CPU 10 determines that the state change ended (YES in step S217), it ends the alternative screen display process, and returns the process to the operation in FIG. 8.

In addition, since the communication with MFP 300 is still enabled though communications traffic is decreased, in step S215, CPU 10 may transmit a parameter to MFP 300 in place of storing the parameter.

Furthermore, when the process based on the user's instruction is a process performed without passing through MFP 300, in steps S207 and S215, CPU 10 itself may perform the process based on the parameter in place of storing the parameter.

When CPU 10 determines that the state change has not yet ended (NO in step S217), it obtains, from MFP 300, the screen information whose information amount is less than the information amount of the screen information of the operation screen displayed on MFP 300 as screen information about the next operation screen shifted based on the user's instruction (step S219). Then, CPU 10 returns the process to step S211, and repeats the subsequent process.

Figure 10:
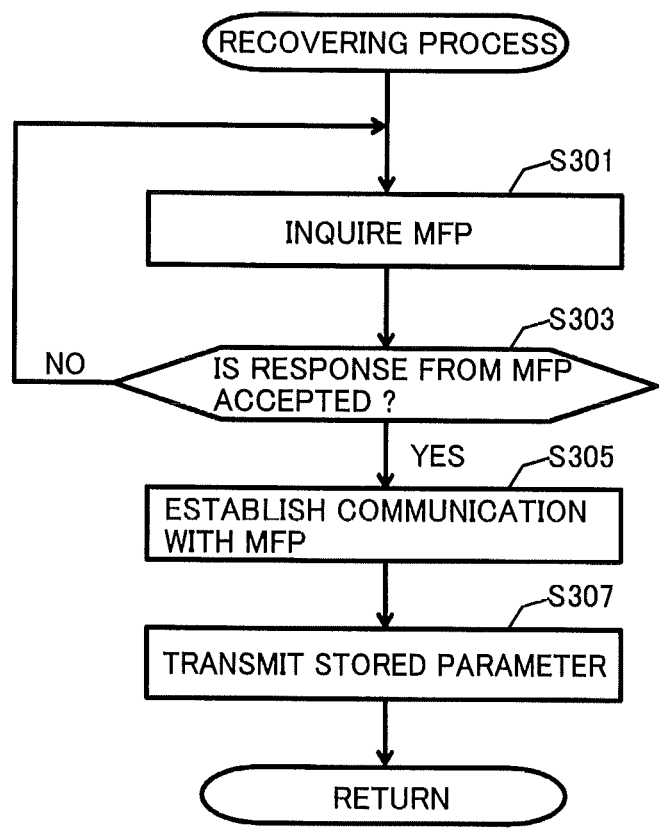
FIG. 10 is a diagram showing a specific example of a recovering process in step S113 in FIG. 8.

FIG. 10 is a diagram showing a specific example of a recovering process in step S113.

Referring to FIG. 10, after determining that a state change occurs in MFP 300 in step S109, CPU 10 inquires MFP 300 about the state at a prescribed timing (step S301). When CPU 10 accepts a response about the state from MFP 300 (YES in step S303), it analyzes the response to determine that the state of MFP 300 is recovered. Then, CPU 10 recovers communication with MFP 300 (step S305), transmits to MFP 300 the parameter that is based on the user's instruction to the alternative screen and stored in the alternative screen display process (step S307), ends the alternative screen display process, and returns the process to the operation in FIG. 8.

When CPU 10 does not receive a response about the state from MFP 300 for a long period of time and when it is not determined that state of MFP 300 is recovered (NO in step S303), CPU 10 may perform a process of connecting to another MFP stored in advance in place of the recovering process. Specifically, in this case, terminal device 100 stores an alternative device in advance for each MFP, such as an alternative device of the same type as the MFP or an alternative device closer to the MFP. Then, when it is not determined after a lapse of the prescribed time period that the state of MFP 300 is recovered, CPU 10 establishes communication with the above-mentioned alternative device. In this case, CPU 10 may select an alternative device, to which communication is established, from among a plurality of stored alternative devices in accordance with the priority order defined in advance; may establish communication after obtaining permission from the user to establish communication with an alternative device; or may establish communication with the alternative device in accordance with the user's selection in that case.

In this case, when CPU 10 establishes communication with an alternative device, it transmits the parameter stored in steps S207 and S215 to the alternative device as in step S307 described above. Consequently, the process based on the user's instruction given after a state change occurs in MFP 300 can be executed in the alternative device.

Effect of Embodiments

As terminal device 100 performs the above-described operation in the image processing system according to the present embodiment, the user can continuously operate MFP 300 using an alternative screen displayed on terminal device 100 even if there occurs a state change influencing the communication between terminal device 100 and MFP 300 such as restart or switching of the setting of the main unit in MFP 300 by the user's instruction through a remote panel while terminal device 100 is performing the remote panel operation with MFP 300. Accordingly, user's convenience is not impaired.

Furthermore, when the state of MFP 300 is recovered, the parameter based on the user's instruction given during occurrence of the state change is transmitted. Accordingly, the process is continuously executed in MFP 300. Therefore, the process in MFP 300 can be continuously executed without impairing the user's convenience for performing a remote panel operation.

Furthermore, the program for causing CPU 10 of terminal device 100 to execute the above-described process can also be provided. The above-described program can be recorded on a non-transitory computer-readable recording medium such as a flexible disk attached to the computer, a CD-ROM (Compact Disk-Read Only Memory), a ROM (Read Only Memory), a RAM (Random Access Memory), and a memory card, and thus, provided as a program product. Alternatively, the program recorded on a non-transitory recording medium such as a hard disk incorporated in a computer can be provided. Furthermore, the program can also be provided by download via a network.

In addition, the program according to the present invention may cause the process to be executed by invoking a required module in a prescribed arrangement at a prescribed timing from program modules provided as part of the operating system (OS) of the computer. In this case, the program itself does not include the above-described modules but cooperates with the OS to execute the process. The program not including the above-described modules may also be included in the program according to the present invention.

Furthermore, the program according to the present invention may be incorporated in a part of another program. Also in such a case, the program itself does not include any modules included in the above-described another program, but cooperates with another program to execute the process. The program included in another program as described above may also be included in the program according to the present invention.

The program product to be provided is installed in a program storage unit such as a hard disk for execution. It is to be noted that a program product includes a program itself and a non-transitory recording medium recording the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A non-transitory computer-readable storage medium storing a control program for causing a computer mounted in a control device to remotely control an image forming apparatus,
   said control device and said image forming apparatus being capable of conducting communication with each other,
   said control program causing said computer to perform:
   obtaining screen information from said image forming apparatus by giving a request to said image forming apparatus, said screen information being information for displaying an operation screen displayed on said image forming apparatus for enabling setting of a parameter according to a user's instruction;
   causing a display device to display the operation screen based on said screen information;
   accepting a user's instruction to said operation screen;
   transmitting information specifying an instructed position on said operation screen based on said user's instruction, to said image forming apparatus;
   determining whether a change in communication conditions influencing said communication between said control device and with said image forming apparatus occurs or not due to a process according to said user's instruction;
   causing said display device to display an alternative screen for accepting the parameter according to the user's instruction generated in the control device based on said screen information instead of the operation screen when it is determined that said change in communication conditions occurs in said image forming apparatus in said step of determining whether a change in communication conditions occurs or not;
   storing the parameter based on the user's instruction to said alternative screen in a storage device;
   determining whether said change in communication conditions has ended or not; and
   recovering communication with said image forming apparatus, and transmitting said parameter stored in said storage device to said image forming apparatus, when it is determined that said change in communication conditions has ended in said determining whether the change in communication conditions has ended or not, wherein
   when it is determined that said change in communication conditions occurs in said step of determining whether a change in communication conditions occurs or not, said control program causes said computer to further perform determining a degree of influence of said change in communication conditions upon said communication, and
   said displaying an alternative screen includes displaying an alternative screen in accordance with the degree of influence of said change in communication conditions upon said communication, and wherein
   in a first case that a decreased amount of said communication as the degree of influence of said change in communication conditions upon said communication is less than a prescribed amount, said control program causes said computer to further perform generating, based on screen information less in information amount than the screen information of the operation screen displayed on said image forming apparatus, a screen simpler than the operation screen displayed on said image forming apparatus as said alternative screen, and in a second case that said decreased amount of said communication is greater than said prescribed amount, said control program causes said computer to further perform generating, based on screen information of an operation screen that can be shifted from the operation screen displayed on said image forming apparatus in addition to the screen information of the operation screen displayed on said image forming apparatus, a screen as said alternative screen on which display contents on the operation screen displayed on said image forming apparatus and display contents on the operation screen that can be shifted from the operation screen displayed on said image forming apparatus are displayed in one screen.

2. The non-transitory computer-readable storage medium according to claim 1, wherein said operation screen includes items to be set and options of parameters that can be set for each of said items, and in said second case, said generating a screen includes generating said alternative screen by inputting said items and said options of parameters for each of said items that are obtained from said screen information into a page form stored in advance.

3. The non-transitory computer-readable storage medium according to claim 1, wherein said control program causes said computer to further perform determining a duration during which said change in communication conditions continues in said second case, and said generating a screen includes generating said alternative screen based on the screen information of up to the operation screens that can be shifted in accordance with said duration.

4. The non-transitory computer-readable storage medium according to claim 1, wherein the operation screen displayed on said image forming apparatus and the operation screen that can be shifted from the operation screen displayed on said image forming apparatus present a hierarchical structure, and in said second case, said generating a screen includes generating said alternative screen based on said screen information reduced in number of items or number of options in accordance with a depth of a hierarchical level from the operation screen displayed on said image forming apparatus.

5. The non-transitory computer-readable storage medium according to claim 1, wherein said operation screen includes a plurality of objects each having a display attribute, and in said first case, said generating a screen includes generating said alternative screen based on said screen information from which the display attribute of the operation screen displayed on said image forming apparatus is reduced.

6. The non-transitory computer-readable storage medium according to claim 1, wherein, when it is determined that a change in communication conditions occurs in said image forming apparatus in said step of determining whether a change in communication conditions occurs or not, said generating an alternative screen includes generating said alternative screen based on said screen information stored in advance, which is obtained from another device and different from said image forming apparatus.

7. The non-transitory computer-readable storage medium according to claim 1, wherein said control program causes said computer to further perform storing the screen information of the operation screen displayed on said display device in said step of displaying the operation screen, and when it is determined that the change in communication conditions occurs in said image forming apparatus in said step of determining whether a change in communication conditions occurs or not, said generating an alternative screen includes generating said alternative screen based on said screen information stored in said step of storing the screen information.

8. The non-transitory computer-readable storage medium according to claim 1, wherein said determining whether a change in communication conditions occurs or not includes analyzing contents of a notification received from said image forming apparatus, to determine whether said change in communication conditions will occur or not before said change in communication conditions occurs in said image forming apparatus.

9. The non-transitory computer-readable storage medium according to claim 1, wherein said determining whether a change in communication conditions occurs or not includes monitoring traffic of communication with said image forming apparatus, and determining that said change in communication conditions occurs when said traffic of communication becomes equal to or less than a threshold value.

10. The non-transitory computer-readable storage medium according to claim 1, wherein said control program causes said computer to perform:

accepting a user's instruction regarding a process that can be performed by said control device to said operation screen;

performing, when said user's instruction is to instruct a process that can be performed by said control device, the process according to the user's instruction to said alternative screen.

11. The non-transitory computer-readable storage medium according to claim 1, wherein said determining whether the change in communication conditions has ended or not includes, after it is determined that said change in communication conditions occurs in said image forming apparatus in said step of determining whether a change in communication conditions occurs or not, monitoring traffic of communication with said image forming apparatus, and determining that said change in communication conditions has ended when said traffic of communication becomes equal to or greater than a threshold value.

12. The non-transitory computer-readable storage medium according to claim 11, wherein said control program causes said computer to further perform determining a duration during which said change in communications conditions continues, and said determining whether said change in communication conditions has ended or not includes monitoring the traffic of communication with said image forming apparatus at a timing based on said duration.

13. The non-transitory computer-readable storage medium according to claim 1, wherein said determining whether the change in communication conditions has ended or not includes, after it is determined that said change in communication conditions occurs in said image forming apparatus in said step of determining whether a change in communication conditions occurs or not, analyzing contents of a notification received from said image forming apparatus, to determine whether said change in communication conditions has ended or not.

14. The non-transitory computer-readable storage medium of claim 1, wherein the parameter corresponds to a setting item for image processing by said image forming apparatus.

15. The non-transitory computer-readable storage medium of claim 1, wherein the alternative screen is a screen including at least one parameter included in said operation screen.

16. The non-transitory computer-readable storage medium of claim 1, wherein different alternative screens are respectively generated based upon a degree of influence of the change in communication conditions.

17. The non-transitory computer-readable storage medium of claim 1, wherein the alternative screen is a screen based on the operation screen and the alternative screen comprises less information than the operation screen.

18. The non-transitory computer-readable storage medium of claim 1, wherein the alternative screen is simpler than the operation screen.

19. The non-transitory computer-readable storage medium of claim 1, wherein the alternative screen is a screen on which display contents of the operation screen displayed on said image forming apparatus and display contents of an operation screen that can be shifted from the operation screen displayed on said image forming apparatus are displayed in one screen.

20. A control device capable of remotely controlling an image forming apparatus, said control device comprising:
an obtaining unit for obtaining screen information from said image forming apparatus by communication with said image forming apparatus, said screen information being information for displaying an operation screen displayed on said image forming apparatus for enabling setting of a parameter according to a user's instruction;
a first display unit for causing a display device to display the operation screen based on said screen information;
a first transmission unit for transmitting information to said image forming apparatus by communication with said image forming apparatus when accepting a user's instruction to said operation screen, said information specifying an instructed position on said operation screen based on said user's instruction;
a determination unit for determining whether a change in communication conditions influencing said communication between said control device and said image forming apparatus occurs or not;
a second display unit for causing said display device to display an alternative screen for accepting the parameter according to the user's instruction generated in the control device based on said screen information instead of the operation screen when it is determined that said change in communication conditions occurs in said image forming apparatus;
a storage unit for storing the parameter based on the user's instruction to said alternative screen in a storage device; and
a second transmission unit for transmitting said parameter stored in said storage device to said image forming apparatus by communication with said image forming apparatus when it is determined that said change in communication conditions has ended,
wherein
said control device is configured to determine a degree of influence of said change in communication conditions upon said communication when said change in communication conditions occurs, and
the alternative screen is displayed in accordance with the degree of influence of said change in communications conditions upon said communication, and wherein
in a first case that a decreased amount of said communication as the degree of influence of said change in communication conditions upon said communication is less than a prescribed amount, said control device is configured to generate, based on screen information less in information amount than the screen information of the operation screen displayed on said image forming apparatus, a screen simpler than the operation screen displayed on said image forming apparatus as said alternative screen, and
in a second case that said decreased amount of said communication is greater than said prescribed amount, said control device is configured to generate, based on screen information of an operation screen that can be shifted from the operation screen displayed on said image forming apparatus in addition to the screen information of the operation screen displayed on said image forming apparatus, a screen as said alternative screen on which display contents on the operation screen displayed on said image forming apparatus and display contents on the operation screen that can be shifted from the operation screen displayed on said image forming apparatus are displayed in one screen.

21. The control device of claim 20, wherein the parameter corresponds corresponding to a setting item for image processing by said image forming apparatus.

22. The control device of claim 20, wherein the alternative screen is a screen including at least one parameter included in said operation screen.

23. The control device of claim 20, wherein different alternative screens are respectively generated based upon a degree of influence of the change in communication conditions.

24. The control device of claim 20, wherein the alternative screen is a screen based on the operation screen and the alternative screen comprises less information than the operation screen.

25. The control device of claim 20, wherein the alternative screen is simpler than the operation screen.

26. The control device of claim 20, wherein the alternative screen is a screen on which display contents of the operation screen displayed on said image forming apparatus and display contents of an operation screen that can be shifted from the operation screen displayed on said image forming apparatus are displayed in one screen.

27. The control device of claim 20, wherein
said operation screen includes items to be set and options of parameters that can be set for each of said items, and
in said second case, said control device is configured to generate a screen by inputting said items and said options of parameters for each of said items that are obtained from said screen information into a page form stored in advance.

28. The control device of claim 20, wherein
said control device is configured to determine a duration during which said change in communication conditions continues in said second case, and
said control device is configured to generate said alternative screen based on the screen information of up to the operation screens that can be shifted in accordance with said duration.

29. The control device of claim 20, wherein
the operation screen displayed on said image forming apparatus and the operation screen that can be shifted from the operation screen displayed on said image forming apparatus present a hierarchical structure, and
in said second case, the control device is configured to generate said alternative screen based on said screen information reduced in number of items or number of options in accordance with a depth of a hierarchical level from the operation screen displayed on said image forming apparatus.

30. The control device of claim 20, wherein
said operation screen includes a plurality of objects each having a display attribute, and
in said first case, said control device is configured to generate said alternative screen based on said screen information from which the display attribute of the operation screen displayed on said image forming apparatus is reduced.

31. The control device of claim 20, wherein when it is determined that a change in communication conditions occurs in said image forming apparatus, said control device is configured to generate said alternative screen based on said screen information stored in advance, which is obtained from another device and different from said image forming apparatus.

32. The control device of claim 20, wherein
the control device is configured to store the screen information of the operation screen displayed on said display device as the operation screen, and
when it is determined that the change in communication conditions occurs in said image forming apparatus, the control device is configured to generate an alternative screen based on said stored screen information.

33. An image processing system comprising:
an image forming apparatus; and
a control device capable of communicating with said image forming apparatus for remotely controlling said image forming apparatus,
said control device including:
an obtaining unit for obtaining screen information from said image forming apparatus by communication with said image forming apparatus, said screen information being information for displaying an operation screen displayed on said image forming apparatus for enabling setting of a parameter according to a user's instruction;
a first display unit for causing a display device to display the operation screen based on said screen information;
a first transmission unit for transmitting information to said image forming apparatus by communication with said image forming apparatus when accepting a user's instruction to said operation screen, said information specifying an instructed position on said operation screen based on said user's instruction;
a determination unit for determining whether a change in communication conditions influencing said communication between said control device and said image forming apparatus occurs or not;
a second display unit for causing said display device to display an alternative screen for accepting the parameter according to the user's instruction generated based on said screen information instead of the operation screen when it is determined that said change in communication conditions occurs in said image forming apparatus;
a storage unit for storing the parameter based on the user's instruction to said alternative screen in a storage device; and
a second transmission unit for transmitting said parameter stored in said storage device to said image forming apparatus by communication with said image forming apparatus when it is determined that said change in communication conditions has ended,
wherein
when said control device determines that said change in communication conditions occurs, said control device is configured to determine a degree of influence of said change in communication conditions upon said communication, and
said alternative screen is displayed in accordance with the degree of influence of said change in communications conditions upon said communication, and wherein
in a first case that a decreased amount of said communication as the degree of influence of said change in communication conditions upon said communication is less than a prescribed amount, said control device is configured to generate, based on screen information less in information amount than the screen information of the operation screen displayed on said image forming apparatus, a screen simpler than the operation screen displayed on said image forming apparatus as said alternative screen, and
in a second case that said decreased amount of said communication is greater than said prescribed amount, said control device is configured to generate, based on screen information of an operation screen that can be shifted from the operation screen displayed on said image forming apparatus in addition to the screen information of the operation screen displayed on said image forming apparatus, a screen as said alternative screen on which display contents on the operation screen displayed on said image forming apparatus and display contents on the operation screen that can be shifted from the operation screen displayed on said image forming apparatus are displayed in one screen.

34. A method of remotely controlling an image forming apparatus by a control device capable of communicating with said image forming apparatus, said method comprising:
requesting, by said control device, said image forming apparatus to transmit screen information to said control device, said screen information being information for displaying an operation screen displayed on said image forming apparatus;
causing, by said control device, a display device to display the operation screen based on said screen information for enabling setting of a parameter according to a user's instruction;
accepting, by said control device, a user's instruction to said operation screen;
transmitting, by said control device, information specifying a position on said operation screen based on said user's instruction to said image forming apparatus;
determining, by said control device, whether a change in communication conditions influencing communication between said image forming apparatus and said control device occurs or not in said image forming apparatus due to a process according to said user's instruction performed by said image forming apparatus;
causing, by said control device, said display device to display an alternative screen for accepting the parameter according to the user's instruction generated in the control device based on said screen information instead of the operation screen when said control device determines that said change in communication conditions occurs in said step of determining whether a change in communication conditions occurs or not;

storing, by said control device, the parameter based on the user's instruction to said alternative screen in a storage device;

determining, by said control device, whether said change in communication conditions has ended or not in said image forming apparatus; and recovering, by said control device, communication between said control device and said image forming apparatus, and transmitting, by said control device, said parameter stored in said storage device to said image forming apparatus, when said control device determines that said change in communication conditions has ended in said step of determining whether said change in communication conditions has ended or not, wherein when it is determined that said change in communication conditions occurs in said step of determining whether a change in communication conditions occurs or not, said control program causes said computer to further perform determining a degree of influence of said change in communication conditions upon said communication, and said displaying an alternative screen includes displaying an alternative screen in accordance with the degree of influence of said change in communication conditions upon said communication, and wherein in a first case that a decreased amount of said communication as the degree of influence of said change in communication conditions upon said communication is less than a prescribed amount, said control program causes said computer to further perform generating, based on screen information less in information amount than the screen information of the operation screen displayed on said image forming apparatus, a screen simpler than the operation screen displayed on said image forming apparatus as said alternative screen, in a second case that said decreased amount of said communication is greater than said prescribed amount, said control program causes said computer to further perform generating, based on screen information of an operation screen that can be shifted from the operation screen displayed on said image forming apparatus in addition to the screen information of the operation screen displayed on said image forming apparatus, a screen as said alternative screen on which display contents on the operation screen displayed on said image forming apparatus and display contents on the operation screen that can be shifted from the operation screen displayed on said image forming apparatus are displayed in one screen.

* * * * *